Patented Feb. 21, 1933

1,898,564

UNITED STATES PATENT OFFICE

EDUARD MUENCH AND FRITZ NICOLAI, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

HYDRAULIC BRAKE FLUID

No Drawing. Application filed November 1, 1929, Serial No. 404,203, and in Germany November 14, 1928.

The present invention relates to the production of liquids suitable for hydraulic machinery.

In most cases water or oils are employed as the liquids for transferring power in hydraulic machines or apparatus, such as brakes, presses, lifting devices and the like. Water can only be used at temperatures above zero centigrade by reason of the danger of freezing, and moreover water readily causes the formation of rust. In many cases oils may be used even at low temperatures, but at these temperatures they have the property of being so viscous that the circulation of the same is greatly hindered, especially when narrow tube conduits, each as usually form the connection between the reservoir and the cylinders, are present, and therefore it is frequently quite impossible to operate quickly.

We have now found that glycols and concentrated mixtures of the same with water constitute liquids which are adapted or suitable for machines or apparatus of the aforesaid nature. These liquids are not only stable to cold, but at temperatures below zero centigrade they have but a low viscosity which amounts to only a fraction of the viscosity of the oils employed for the same purpose. The glycols or the mixtures of the same with water are of the nature of oily lubricants; they show no tendency to cause the formation of rust and, in contrast to oils, they do not attack the rubber joints or packings.

Highly concentrated aqueous solutions of glycols are particularly advantageous for the aforesaid purposes because they possess the advantages hereinbefore described to a specially marked degree. The quantity of water should, generally, not exceed 50 per cent by weight of the glycol, a quantity from 30 to 40 per cent usually giving good results. For example the viscosity of a 60 percent aqueous solution of ethylene glycol, the solidification point of which lies between −52° and −54° centigrade, amounts to 1.4° Engler at 20° centigrade, to 2° Engler at 0° centigrade and to about 6° Engler at −20° centigrade. In contrast to this, the viscosity of a good compressor oil amounts to 15.6° Engler at 20° centigrade, to 90° Engler at 0° centigrade and to more than 1500° Engler at −20° centigrade.

In addition to the glycols, such as ethylene glycol or 1.3-butylene glycol, hydroxy-alkyl ethers of glycols, such as the polyglycols, for example di-ethylene glycol, tri- or tetra-ethylene glycol or the like and the ethers of the glycols and polyglycols, for example ethylene glycol mono-ethyl ether, polyglycol ethers, such as di-ethylene glycol mono-ethyl ether and the like, or mixtures of the same, or aqueous solutions of these substances, are for example also suitable. It is frequently advantageous to mix other polyhydric alcohols, such as erythritol, glycerol and the like, with the said substances or with mixtures of the same. In particular, in this manner, any desired degree of viscosity may be attained.

The lubricating power of the aforesaid glycols or their concentrated solutions is, however, not very high and is insufficient for many purposes. In order to avoid this drawback a sulphuric derivative of one or more organic compounds containing at least 6 carbon atoms in their molecule is added. These sulphuric derivatives can be chosen from sulphonic acids or from sulphuric esters of organic compounds of a high molecular weight and are preferably employed in the neutral state, i. e. in the form of salts. Specific examples of such sulphuric derivatives are Turkey red oils, such as castor oil sulphuric ester, or true sulphonic acids of such or other aliphatic compounds, such as the sulphonic acids of oleic acid, or aromatic sulphonic acids, in particular alkylated aromatic sulphonic acids, for example those of propylated or butylated naphthalene and the sulphonic acids obtainable from mineral oils, tar oils or fractions or residues from the distillation or purification of such oils or fractions thereof. The said additions are employed generally in a quantity of from about 10 to 20 per cent of the glycols or their solutions, but the quantity added may be increased also to 50 or even to 100 per cent.

The effect of these additions will be further illustrated by the following table, the values of the lubricating power being determined according to the method of Suthau, the time (in minutes) being measured while employing a load of 3 kilograms per square centimetre.

| Composition | I<br>Commercial compressor oil | II<br>a { 30 parts of water<br>63 parts of ethylene glycol<br>7 parts of polyglycol ether } | III<br>a—10 per cent of<br>b { neutralized sulphuric ester of castor oil } | IV<br>a—20 per cent of b |
|---|---|---|---|---|
| Viscosity degrees Engler at +20° centigrade | 15.6 | 1.5 | 2.5 | 2 |
| At —20° centigrade | 1500–2000 | 8 | 11.5 | 13.7 |
| Solidification at degrees centigrade | —25 | Below —45 | Below —45 | Below —45 |
| Lubricating power | 50–56 | 18 | 32 | 38 |

If foaming should occur owing to quick motion of the liquid in bent conduits and the like, this can be reduced or completely avoided by an addition of agents reducing the surface tension such as ethyl, propyl or butyl alcohol or mixtures thereof.

The following example will further illustrate the nature of this invention, but the invention is not restricted thereto.

*Example*

In a hydraulic lifting device, in which, after the performance of work, the liquid is again led back from the cylinder into the reservoir by back pressure, and in which, hitherto, a good compressor oil has been employed as the liquid and the time necessary for this liquid to flow back into the reservoir has been about 20 seconds at 20° centigrade and about 4 minutes at 0° centigrade, the compressor oil is replaced by a mixture consisting of from 52 to 53 parts of ethylene glycol, 6 parts of polyethylene glycol ether, 25 parts of water and from 16 to 17 parts of a neutral sulphuric ester of ricinoleic acid. The time then taken for the liquid to flow back into the reservoir after the performance of work is only 5 to 6 seconds both at 20° centigrade and at 0° centigrade, while at —30° centigrade it is only 9 seconds.

If foaming should occur this can be avoided by adding to the mixture from 1 to 2 per cent of its weight of butyl alcohol.

Other valuable mixtures may be composed as follows:—

(a) 28 litres of ethylene glycol
    12 litres of butanol
    20 litres of a 50 per cent aqueous solution of a neutral sulphuric ester of ricinoleic acid;

(b) 30 litres of ethylene glycol
    30 litres of glycerol
    20 litres of water
    30 litres of a 50 per cent aqueous solution of a neutral sulphonic acid of olein;

(c) 20 litres of ethylene glycol
    30 litres of di-ethylene glycol
    20 litres of water
    10 litres of a from 50 to 60 per cent aqueous solution of the sodium salt of sulphonic acid of oleic acid. In these preparations the sulphuric derivatives may be substituted by each other or by mixtures thereof.

What we claim is:—

1. As a composition of matter, a liquid, water-soluble preparation suitable for hydraulic machinery comprising a water-soluble glycol and a water-soluble sulphuric derivative of an organic compound containing at least six carbon atoms in its molecule.

2. As a composition of matter, a liquid, water-soluble preparation suitable for hydraulic machinery comprising a water-soluble glycol and from about 10 to 100 per cent of its weight of a water-soluble sulphuric derivative of an organic compound containing at least six carbon atoms in its molecule.

3. As a composition of matter, a liquid, water-soluble preparation suitable for hydraulic machinery comprising a mixture of a water-soluble glycol and another water-soluble polyhydric alcohol and from about 10 to 100 per cent of its weight of a water-soluble sulphuric derivative of an organic compound containing at least carbon atoms in its molecule.

4. As a composition of matter, a liquid, water-soluble preparation suitable for hydraulic machinery comprising a mixture of a water-soluble glycol with up to 50 per cent of its weight of water, and from about 10 to 100 per cent by weight of the mixture of a water-soluble sulphuric derivative of an organic compound containing at least six carbon atoms in its molecule.

5. As a composition of matter, a liquid, water-soluble preparation suitable for hydraulic machinery comprising a water-soluble glycol, a water-soluble ether of a glycol, and from about 10 to 100 per cent by weight of the mixture of a water-soluble sulphuric derivative of an organic compound containing at least six carbon atoms in its molecule.

6. As a composition of matter, a liquid, water-soluble preparation suitable for hydraulic machinery comprising a water-soluble glycol, a water-soluble ether of a glycol, up to 50 per cent by weight of the mixture of water, and from about 10 to 100 per cent by weight of the whole mixture of a water-soluble sulphuric derivative of an organic compound containing at least six carbon atoms in its molecule.

7. As a composition of matter, a liquid, water-soluble preparation suitable for hydraulic machinery comprising ethylene glycol and a water-soluble sulphuric ester of an organic compound containing at least six carbon atoms in its molecule.

8. As a composition of matter, a liquid, water-soluble preparation suitable for hydraulic machinery comprising a mixture of ethylene glycol with up to 50 per cent of its weight of water, and from about 10 to 100 per cent by weight of the mixture of a water-soluble sulphuric ester of an organic compound containing at least six carbon atoms in its molecule.

9. As a composition of matter, a liquid, water-soluble preparation suitable for hydraulic machinery comprising a mixture of ethylene glycol with glycerol, up to 50 per cent of its weight of water, and from about 10 to 100 per cent by weight of the mixture of a water-soluble sulphuric ester of an organic compound containing at least six carbon atoms in its molecule.

10. As a composition of matter, a liquid, water-soluble preparation suitable for hydraulic machinery comprising a mixture of ethylene glycol with about 30 per cent of its weight of water, and about 20 per cent by weight of the mixture of a water-soluble sulphuric ester of an organic compound containing at least six carbon atoms in its molecule.

11. As a composition of matter, a liquid, water-soluble preparation suitable for hydraulic machinery comprising a mixture of ethylene glycol with about 30 per cent of its weight of water, and about 20 per cent by weight of the mixture of a neutralized sulphuric ester of an organic compound containing at least six carbon atoms in its molecule.

12. As a composition of matter, a liquid, water-soluble preparation suitable for hydraulic machinery comprising a mixture of ethylene glycol with a water-soluble ether of a glycol, about 30 per cent by weight of the mixture of water, and about 20 per cent by weight of the whole mixture of a neutralized sulphuric ester of castor oil.

In testimony whereof we have hereunto set our hands.

EDUARD MUENCH.
FRITZ NICOLAI.